(12) United States Patent
Matsumoto (10) Patent No.: US 12,555,411 B2
(45) Date of Patent: Feb. 17, 2026

(54) FACIAL EMOTION RECOGNITION SYSTEM (71) Applicant: Humintell, LLC, El Cerrito, CA (US)

(72) Inventor: David Matsumoto, Richmond, CA (US)

(73) Assignee: Humintell, LLC, El Cerrito, CA (US)

( * ) Notice: Subject to any disclaimer, the term of this patent is extended or adjusted under 35 U.S.C. 154(b) by 324 days.

(21) Appl. No.: 18/128,161

(22) Filed: Mar. 29, 2023

(65) Prior Publication Data
US 2023/0316809 A1  Oct. 5, 2023

Related U.S. Application Data (60) Provisional application No. 63/325,530, filed on Mar. 30, 2022.

(51) Int. Cl.
*G06V 40/16* (2022.01)
*G06V 40/20* (2022.01)

(52) U.S. Cl.
CPC ............ *G06V 40/174* (2022.01); *G06V 40/20* (2022.01)

(58) Field of Classification Search
CPC .... G06V 40/174; G06V 40/20; G06V 10/764; G06V 20/40
See application file for complete search history.

(56) References Cited

U.S. PATENT DOCUMENTS

| | | | |
|---|---|---|---|
| 7,246,081 B2 | 7/2007 | Hill | |
| 2006/0206371 A1 | 9/2006 | Hill | |
| 2008/0260212 A1* | 10/2008 | Moskal | G06V 40/1371 |
| | | | 382/209 |
| 2009/0285456 A1* | 11/2009 | Moon | G06V 40/176 |
| | | | 382/118 |
| 2011/0026779 A1 | 2/2011 | Matsumoto et al. | |
| 2011/0038547 A1 | 2/2011 | Hill | |
| 2012/0002848 A1 | 1/2012 | Hill | |
| 2012/0101735 A1 | 4/2012 | Velusamy et al. | |
| 2013/0094722 A1 | 4/2013 | Hill | |
| 2014/0050408 A1 | 2/2014 | Balasubramanian et al. | |
| 2014/0112556 A1 | 4/2014 | Kalinli-Akbacak | |
| 2014/0242560 A1 | 8/2014 | Movellan et al. | |
| 2021/0174934 A1 | 6/2021 | Kilmer et al. | |
| 2021/0195142 A1* | 6/2021 | Mireles | A61M 39/08 |

OTHER PUBLICATIONS

International Preliminary Report on Patentability in International Application No. PCT/US2023/016985, mailed Oct. 10, 2024.
International Search Report and Written Opinion in International Application No. PCT/US2023/016985, mailed Jul. 6, 2023.

* cited by examiner

*Primary Examiner* — Ming Y Hon
(74) *Attorney, Agent, or Firm* — DLA Piper LLP (US)

(57) ABSTRACT

A computing system identifies video data capturing an expressor depicting facial behavior. The computing system analyzes the video data to determine a type of emotion exhibited by the expressor in the video data by identifying appearance changes produced by movements of facial muscles in the video data; and determining timing characteristics of the movements of the facial muscles in the video data, the timing characteristics indicating whether the facial behavior depicted by the expressor is an authentic expression or fake expression. The computing system generates a classification of the type of emotion exhibited by the expressor based on the movements of the facial muscles and the timing characteristics of the movements. The computing system outputs the classification.

9 Claims, 6 Drawing Sheets

FIG. 5B

FACIAL EMOTION RECOGNITION SYSTEM

CROSS-REFERENCE TO RELATED APPLICATIONS

This application claims priority to U.S. Provisional Application Ser. No. 63/325,530, filed Mar. 30, 2022, which is hereby incorporated by reference in its entirety.

FIELD OF THE DISCLOSURE

Embodiments disclosed herein generally related to a facial emotion recognition system.

BACKGROUND

Facial emotion recognition is a method of measuring facial emotions by identifying facial expressions of emotion that occur with muscular contractions. Such facial emotional expressions may be detected by comparison to known facial muscle movements in order to categorize or classify an emotion exhibited by an individual.

SUMMARY

In some embodiments, a method is disclosed herein. A computing system identifies video data capturing an expressor depicting facial behavior. The computing system analyzes the video data to determine a type of emotion exhibited by the expressor in the video data by identifying appearance changes produced by movements of facial muscles in the video data and determining timing characteristics of the movements of the facial muscles in the video data, the timing characteristics indicating whether the facial behavior depicted by the expressor is an authentic expression or fake expression. The computing system generates a classification of the type of emotion exhibited by the expressor based on the movements of the facial muscles and the timing characteristics of the movements; and outputting, by the computing system, the classification.

In some embodiments, a non-transitory computer readable medium is disclosed herein. The non-transitory computer readable medium includes one or more sequences of instructions, which, when executed by a processor, causes a computing system to perform operations. The operations include identifying, by the computing system, video data capturing an expressor depicting facial behavior. The operations further include analyzing, by the computing system, the video data to determine a type of emotion exhibited by the expressor in the video data by identifying appearance changes produced by movements of facial muscles in the video data and determining timing characteristics of the movements of the facial muscles in the video data, the timing characteristics indicating whether the facial behavior depicted by the expressor is an authentic expression or fake expression. The operations further include generating, by the computing system, a classification of the type of emotion exhibited by the expressor based on the movements of the facial muscles and the timing characteristics of the movements. The operations further include outputting, by the computing system, the classification.

In some embodiments, a system is disclosed herein. The system includes a processor and a memory. The memory has programming instructions stored thereon, which, when executed by the processor, causes the system to perform operations. The operations include identifying video data capturing an expressor depicting facial behavior. The operations further include analyzing the video data to determine a type of emotion exhibited by the expressor in the video data by identifying appearance changes produced by movements of facial muscles in the video data and determining timing characteristics of the movements of the facial muscles in the video data, the timing characteristics indicating whether the facial behavior depicted by the expressor is an authentic expression or fake expression. The operations further include generating a classification of the type of emotion exhibited by the expressor based on the movements of the facial muscles and the timing characteristics of the movements. The operations further include outputting the classification.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventional approaches to assessing facial expressions of emotion typically include adopting a listing of appearance changes due to presumed facial muscle movements that have been empirically shown to be associated with facial expressions and emotion. Such conventional approaches typically rely on full-face, prototypical configurations of facial behaviors displayed in still images (e.g., photographs). In particular, conventional approaches describe what the prototypical facial configurations of emotions look like, but they do not describe the wide variety of emotional expressions that the face is capable of producing, nor do they account for the dynamics of such expressions related to timing and symmetry.

Most conventional approaches to expression recognition technology typically involve analyzing video on a frame-by-frame basis, identifying the appearance changes due to presumed facial muscle movements that are innervated in each frame, and classifying the presumed facial behavior as emotional expressions based on whether those appearance changes match the known facial muscle appearance changes in the published prototypes. Such approaches typically fail to account for the behavioral dynamics of the muscle movements and the many different types of variations or permutations of those full-face configurations that signal emotion.

Additionally, because most conventional approaches classify presumed emotions on a frame-by-frame basis, most conventional approaches then produce data about presumed emotional expressions on a frame-by-frame basis, typically expressed in ratio or probabilities of emotion expression.

One or more techniques disclosed herein provide an improvement over conventional systems by supporting many different types of facial muscle configurations that signal emotions and that go far beyond the full-face, prototypical expressions utilized by conventional systems. For example, one or more techniques described herein provide a fundamentally different method of assessing facial behavior for the purpose of classifying behavior as emotional expressions compared to conventional approaches by, for example, taking advantage of known expression dynamics of true emotional expressions and identifying the nature of the behavioral dynamics of the expressions. In this manner, the present techniques are able to classify an increased number of variants of each emotion compared to conventional approaches.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described.

The term "expressor" as used herein may refer to a person who produces the facial behavior to be analyzed. In some embodiments, the "user" may be the "expressor." In some embodiments, the "user" may be distinct from the "expressor."

The term "action units" as used herein may refer to elemental muscle movements of facial muscles as based on the Facial Action Coding System.

The term "behavior" as used herein may refer to unclassified facial movements of an expressor.

The term "expression" as used herein may refer to the classified facial movements of the expressor.

The term "excursion" or "excursions" as used herein may refer to the movement or movements of action units in any facial behavior. In some embodiments, excursions may be defined as movements (e.g., innervations) of the facial muscles or combinations of them from a starting point to another point at a greater intensity and then returning to a baseline or resting state of lower intensity. These excursions may move the skin on the face of the expressor and may cause an appearance change. In some embodiments, an intensity change from a starting position to apex (e.g., a maximum contraction of the facial muscle) may be such that it produces an observable result (e.g., least one intensity level difference) between the starting position and the apex. In some embodiments, expressions can start from a neutral intensity (e.g., the muscle was not contracted at all to begin with) or from some degree of an already existing contraction. In those embodiments in which the expression starts from a degree of an already existing contraction, the new expression may be superimposed over a previously existing one. In some embodiments, the lower intensity state to which an excursion may return can be neutral (no evidence of innervation) or non-neutral. The lower intensity state may be enough to produce an observable decrease (e.g., at least one intensity level difference).

Figure 1:
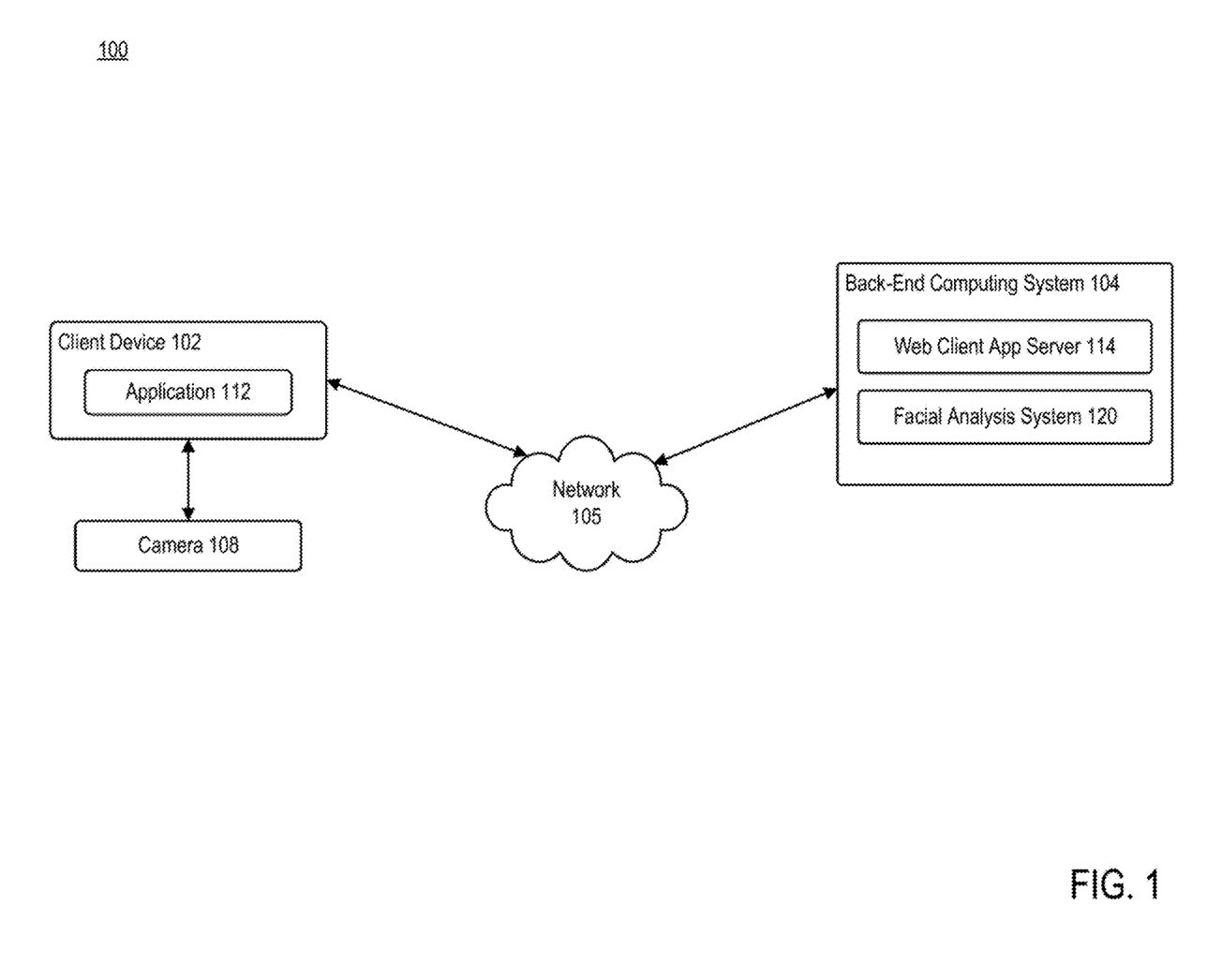
FIG. 1 is a block diagram illustrating a computing environment, according to one exemplary embodiment.

FIG. 1 is a block diagram illustrating computing environment 100, according to one embodiment. Computing environment 100 may include a client device 102 and a back-end computing system 104 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

Client device 102 may be operated by a user. Client device 102 may be representative of a mobile device, a tablet, a desktop computer, or any computing system having the capabilities described herein. Client device 102 may include at least application 112.

Application 112 may be representative of an application associated with back-end computing system 104. In some embodiments, application 112 may be a standalone application associated with back-end computing system 104. In some embodiments, application 112 may be representative of a web-browser configured to communicate with back-end computing system 104. In some embodiments, client device 102 may communicate over network 105 to access functionality of back-end computing system 104 via web client application server 114 of back-end computing system 104. The content that is displayed to client device 102 may be transmitted from web client application server 114 to client device 102, and subsequently processed by application 112 for display through a graphical user interface (GUI) of client device 102.

As shown, client device 102 may be associated with a camera 108. In some embodiments, camera 108 may be integrated within client device 102 (e.g., front facing camera, rear facing camera, etc.). In such embodiments, a user may grant application 112 access to camera 108, such that client device 102 can upload image data or video data of an expressor to back-end computing system 104.

In some embodiments, camera 108 may be a separate component from client device 102. For example, camera 108 may be in communication with client device 102 via one or more wired (e.g., USB) or wireless (e.g., WiFi, Bluetooth, etc.) connections. In some embodiments, camera 108 may transmit or provide client device 102 with the captured image data or video data for upload to back-end computing system 104 via application 112. In some embodiments, camera 108 may transmit or provide the captured image data or video data directly to back-end computing system 104 over network 105.

More generally, a user may utilize camera 108 for capturing image data and/or video data of the expressor's facial behavior and expressions.

Back-end computing system 104 may analyze the image data and/or video data to assess the facial behavior. In some embodiments, back-end computing system 104 may be configured to analyze the image data and/or video data in real-time (or near real-time). In some embodiments, back-end computing system 104 may be configured to analyze pre-stored image data and/or video data.

Back-end computing system 104 may be in communication with client device 102 and/or camera 108. Back-end computing system 104 may include web client application server 114 and facial analysis system 120. Facial analysis system 120 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Facial analysis system 120 may be configured to analyze the uploaded image data and/or video data to determine an emotion or range of emotions exhibited by the expressor. For example, facial analysis system 120 may utilize one or more machine learning techniques to determine an emotion or range of emotions exhibited by the expressor.

An emotion may refer to a reaction to a stimulus. The stimulus can be real, physical, and external to the individual or imagined within an individual (e.g., a thought or memory). Emotional reactions typically have physiological, psychological, and social components. Emotional expressions are observable behaviors that may signal the existence of an emotional state.

To determine an expressor's emotion, in some embodiments, facial analysis system 120 may analyze the expressor's facial behavior based on the image data and/or video data. Facial behavior may refer to any movement of the facial muscles. Most facial behaviors cause appearance changes by moving the skin and producing wrinkling movement patterns. Some facial behaviors, however, may not produce observable appearance changes.

Figure 2A:
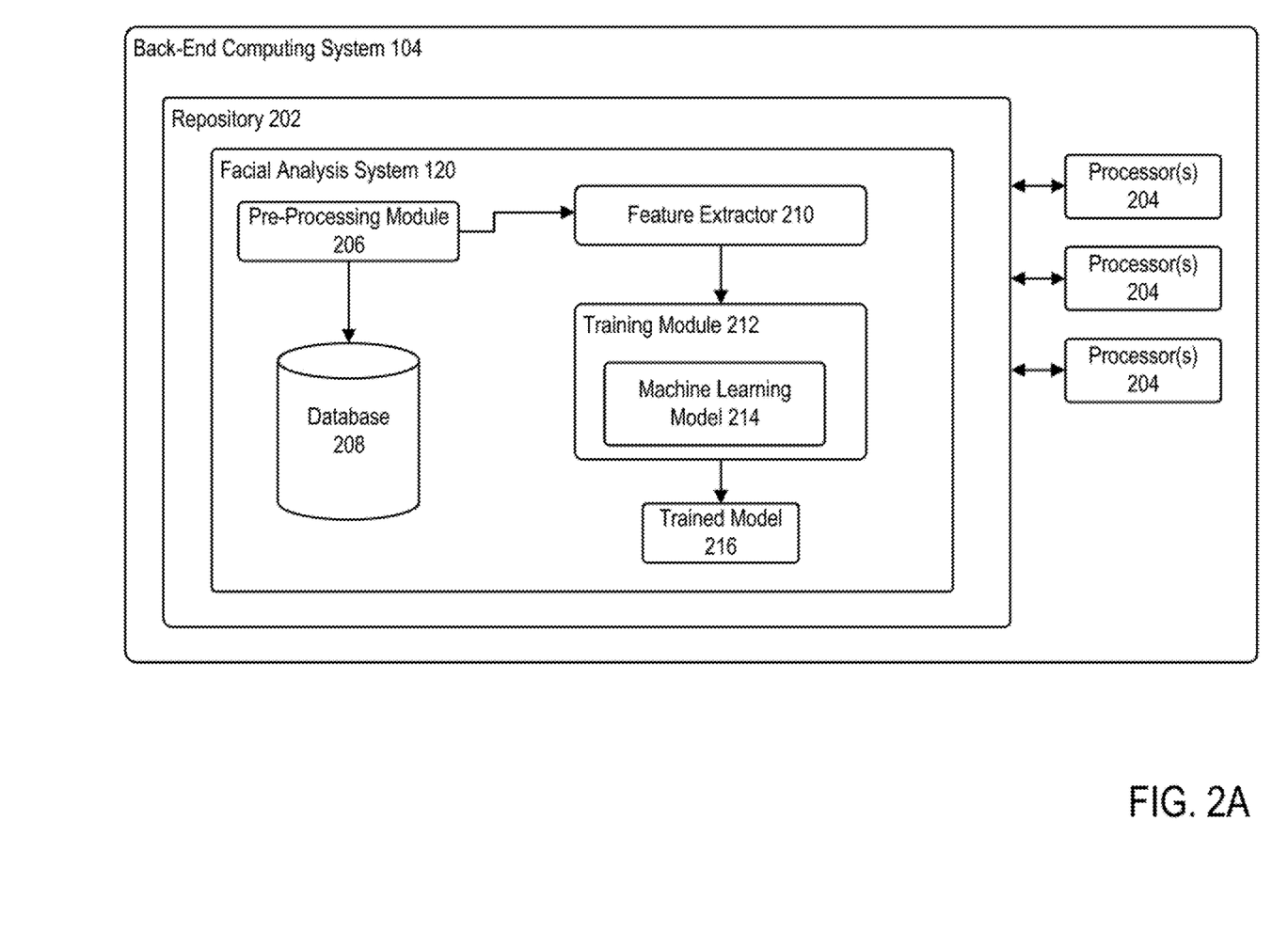
FIG. 2A is a block diagram illustrating facial analysis system, according to one exemplary embodiment.

FIG. 2A is a block diagram illustrating back-end computing system 104, according to example embodiments. As shown, back-end computing system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least facial analysis system 120.

As shown, facial analysis system 120 may include pre-processing module 206, database 208, training module 212, and machine learning model 214. Each of pre-processing module 206 and training module 212 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Pre-processing module 206 may be configured to generate training data sets from data stored in database 208. Generally, database 208 may include videos and/or images of high quality portrayals of known facial expressions of emotion depicted by individuals from multiple race/ethnic groups and genders. In some embodiments, database 208 may also include images and/or videos of partial images of faces.

In some embodiments, the training data may include still photos or videos of known facial expressions of seven emotions (e.g., anger, contempt, disgust, fear, happiness, sadness, and surprise). Such photos or videos may have been previously coded using the Facial Action Coding System (FACS). FACS codes were then used to select the best examples of the images to known, published characterizations of facial expressions of emotion based on decades of research. In some embodiments, these still photos may be combined with the neutral images of the same expressor, and then rendered to create a moving face in a video, with the target facial expression of emotion going from onset, through apex, and then offset. These videos thus include the most sanitized moving versions of seven facial expressions of emotions.

Training module 212 may be configured to train machine learning model 214 to classify a facial expression of emotion of an expressor based on the training data set. In some embodiments, training may include a process in which training module 212 trains machine learning model 214 to identify action units and excursions of action units and learn timing characteristics of the action units and excursions which may be indicative of a facial expression of emotion.

Training module 212 may be configured to train machine learning model 214 to identify action units and excursions of action units. Generally, Facial expressions of emotions are facial behaviors that involve one or more characteristics. For example, facial expressions may involve movements of the specific configurations of target facial muscles. In some embodiments, the configurations may occur in response to a stimulus. The movements of those muscles may match specific criteria concerning their behavioral dynamics. Facial analysis system 120 may be trained to determine the expressor's emotion or range of emotions by analyzing the expressor's elemental muscle movements.

Training module 210 may be configured to train machine learning model 214 to identify and monitor the action units of an expressor. In some embodiments, training module 210 may train machine learning model 214 to monitor all action units of the expressor. For example, facial analysis system 120 may analyze all action units that are simultaneously occurring at their respective apex. The combination of action units at simultaneous apex may be classified by facial analysis system 120 as a configuration.

Training module 212 may further be configured to train machine learning model 214 to classify facial expressions of emotion of expressors based on learned features that may be indicative of facial classes of emotion. For example, using training data set, training module 212 may train machine learning model 214 to match detected configurations with a set of known or critical action units. Based on the set of critical action units, machine learning model 214 may identify a possible facial expression of emotion exhibited by the expressor. Exemplary known facial expressions of emotion may include, but are not limited to, anger, contempt, disgust, fear, enjoyment smile, and the like.

In some embodiments, the possible facial expression of the expressor may be classified as a "possible facial expressions of emotion." Based on the possible facial expressions of emotion, training module 212 may train machine learning model 214 to compare non-critical action units in the facial configurations to allowed and not allowed lists of non-critical action units to further refine the possible facial expressions of emotion classification. Non-critical action units that are in the "Allowed" list may be representative of action units that do not interfere with the classification of the configurations as possible facial expressions of emotion. Non-critical action units that are in the not allowed list may qualify the classification of possible facial expressions of emotion. In some embodiments, machine learning model 214 may be trained to maintain non-critical action units in its analysis or output. For example, machine learning model 214 may note the non-critical action units with a question mark.

In some embodiments, the training process may include machine learning model 214 learning timing characteristics of movements that may be indicative of certain facial expressions. As discussed above, a limitation in conventional facial analysis programs is that they rely on frame-by-frame analysis of topographic changes in the face as detected, for example, by pixel changes, coloration, spectrometry, or other such visual cues in the images. Such conventional approaches ignore important temporal dynamics that are associated with true, spontaneous facial expressions of emotion. One of the biggest and more important factors in deciphering between true and false facial expressions of emotion is in their timing characteristics. Humans can simulate most of the facial expressions of emotion that have been documented by research to occur across cultures. For example, when an expressor simulates a facial expression of emotion, the simulation may have the same facial movements (or facial actions) as true spontaneous facial expressions, but simulated facial expression differs from the true facial expressions in their timing characteristics. Because the current state of the art utilizes a frame-by-frame analysis of faces and computes probabilities of a match to a known facial expression on each image, such approaches fail to account for temporal dynamics of facial expressions that occur across many images.

Machine learning and artificial intelligence offers the unique ability to address this limitation in the current state of the art by allowing for processing of frame-by-frame data and detecting temporal dynamics of the expressions exhibited by the expressors through a variety of learned timing characteristics.

Training module 212 may be configured to train machine learning model 214 to learn timing characteristics that may be representative of true spontaneous facial expressions. Exemplary characteristics may include, but are not limited to: simultaneous onset of multiple muscle movements in the same configuration, smooth onset accelerations of multiple muscle movements in the same configuration, simultaneous apexes of multiple muscle movements in the same configuration, shared apex duration of multiple muscle movements in the same configuration, symmetry of multiple muscle movements in the same configuration with limited exceptions, and smooth offset declarations of multiple muscle movements in the same configuration.

A simultaneous onset may occur if the expression involves multiple muscles. Generally, the excursions of the multiple muscles should start at relatively the same time.

Smooth onset accelerations may refer to the relative smoothness of the onset of the muscles, i.e., the smooth acceleration, muscle movements to apex. Generally, the acceleration to apex should be smooth, i.e., equal or equivalent rates of change divided by time to be similar for multiple muscle movements.

Simultaneous apex may refer to the muscles included in the expression peaking at approximately the same time.

Shared apex duration may refer to the duration of shared apexes. For example, multiple muscles in the same configuration should have equal or equivalent apex durations and should last no more than a predefined number of seconds (e.g., 4 or 5 seconds), if the emotion is in reaction to a single elicitor. Exceptions to this rule may be made on a case by case basis.

Symmetry may refer to the shape of the expression. Generally, an expressor's expression should be symmetrical for most expressions, i.e., the muscles on the right and left sides of face should share the same timing characteristics defined herein, with some limited exceptions.

Smooth offset declarations may refer to the offset of muscles, i.e., the decline to baseline. Generally, the offset of muscles should be smooth, i.e., equal or equivalent rates of change divided by time to be similar for multiple muscle movements. However, as mentioned above, an expressor's expressions do not need to return to a baseline. For an event that includes a combination of action units, the offset of that event may be determined based on the offset of the first target action unit form that event.

Thus, training module 212 may train machine learning model 214 to detect and/or analyze timing characteristics of the movement of the expressor's action units when determining an expressor's facial expression of emotion.

Once training is complete, a trained machine learning model ("trained model 216") may be deployed in a computing environment. In some embodiments, trained model 216 may be deployed locally. In some embodiments, trained model 216 may be deployed in a cloud-based environment.

In some embodiments, machine learning model 214 may be representative of one or more of machine learning models or algorithms that may include, but are not limited to, random forest model, support vector machines, neural networks, deep learning models, Bayesian algorithms, convolutional neural networks, and the like.

Figure 2B:
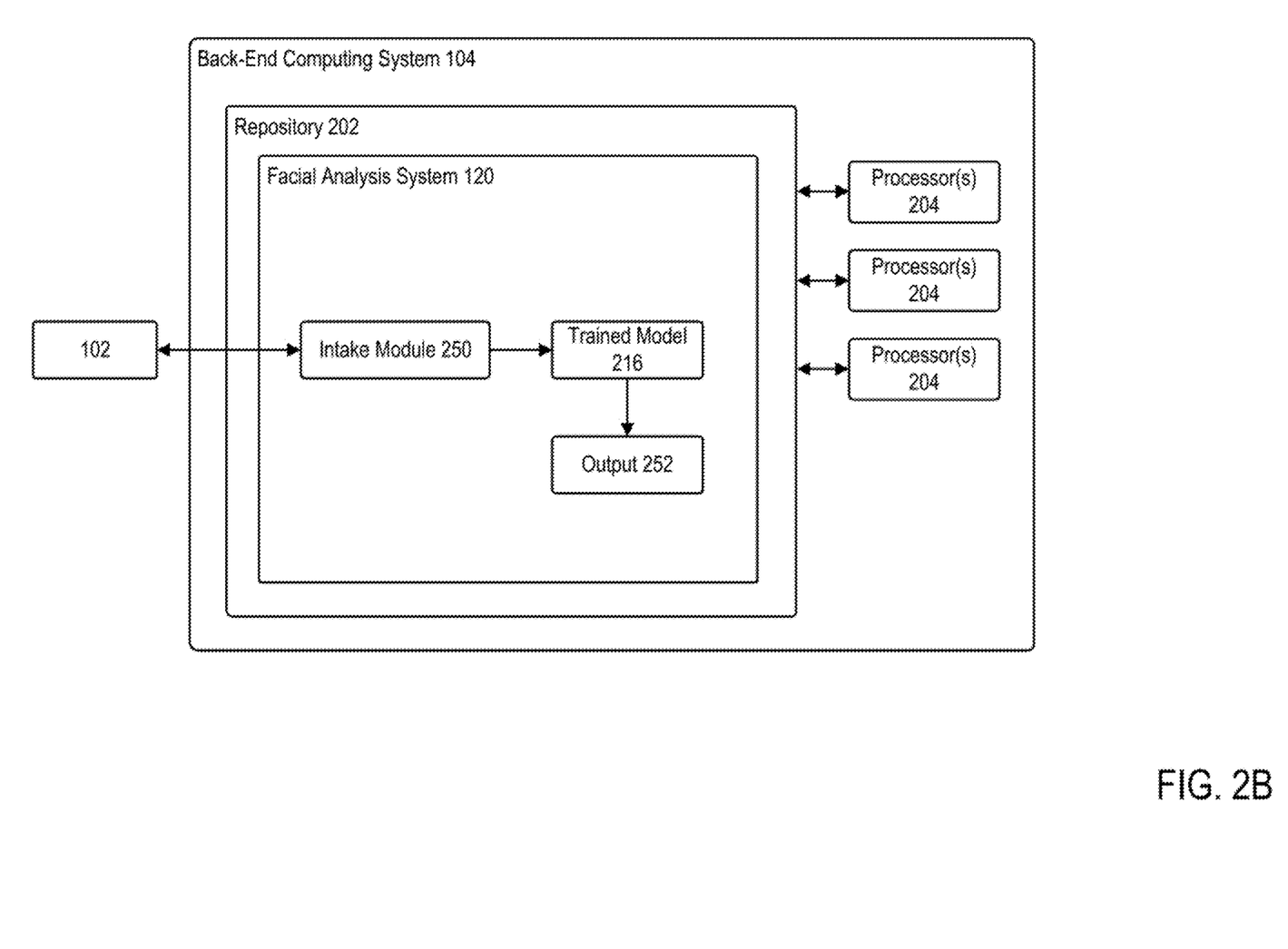
FIG. 2B is a block diagram illustrating facial analysis system, according to one exemplary embodiment.

FIG. 2B is a block diagram illustrating back-end computing system 104, according to example embodiments. FIG. 2B may represent a deployment computing environment for trained model 216 following training.

As shown, intake module 250 may receive video data of an expressor. In some embodiments, intake module 250 may be configured to pre-process the video data. For example, intake module 250 may be configured to upsample or downsample the video data prior to input to trained model 216.

Trained model 216 may receive the video data of the expressor as input. Based on the video data of the expressor, trained model 216 may generate output 252. Generally, output 252 may rep-resent a facial expression of emotion of the expressor.

Output 252 may be represented in a variety of ways. In some embodiments, output 252 may be represented as JSON files that include probabilities of the occurrences of various facial expressions of emotion spontaneously. In some embodiments, such JSON files may be stored in database 208 and used in a feedback loop for training or retraining machine learning model 214.

In some embodiments, output 252 may be provided in terms of specific emotion categories detected. For example, because trained model 216 is trained to account for timing characteristics, and because expression and intensity of emotional reactions are highly correlated, the temporal data can be used to represent the intensity of the detected emotion. Such output is an improvement over the current state of the art, which is limited to merely detecting the probability of the presence or absence of an emotion based on still images and the intensity or strength of that emotional reaction.

Figure 3:
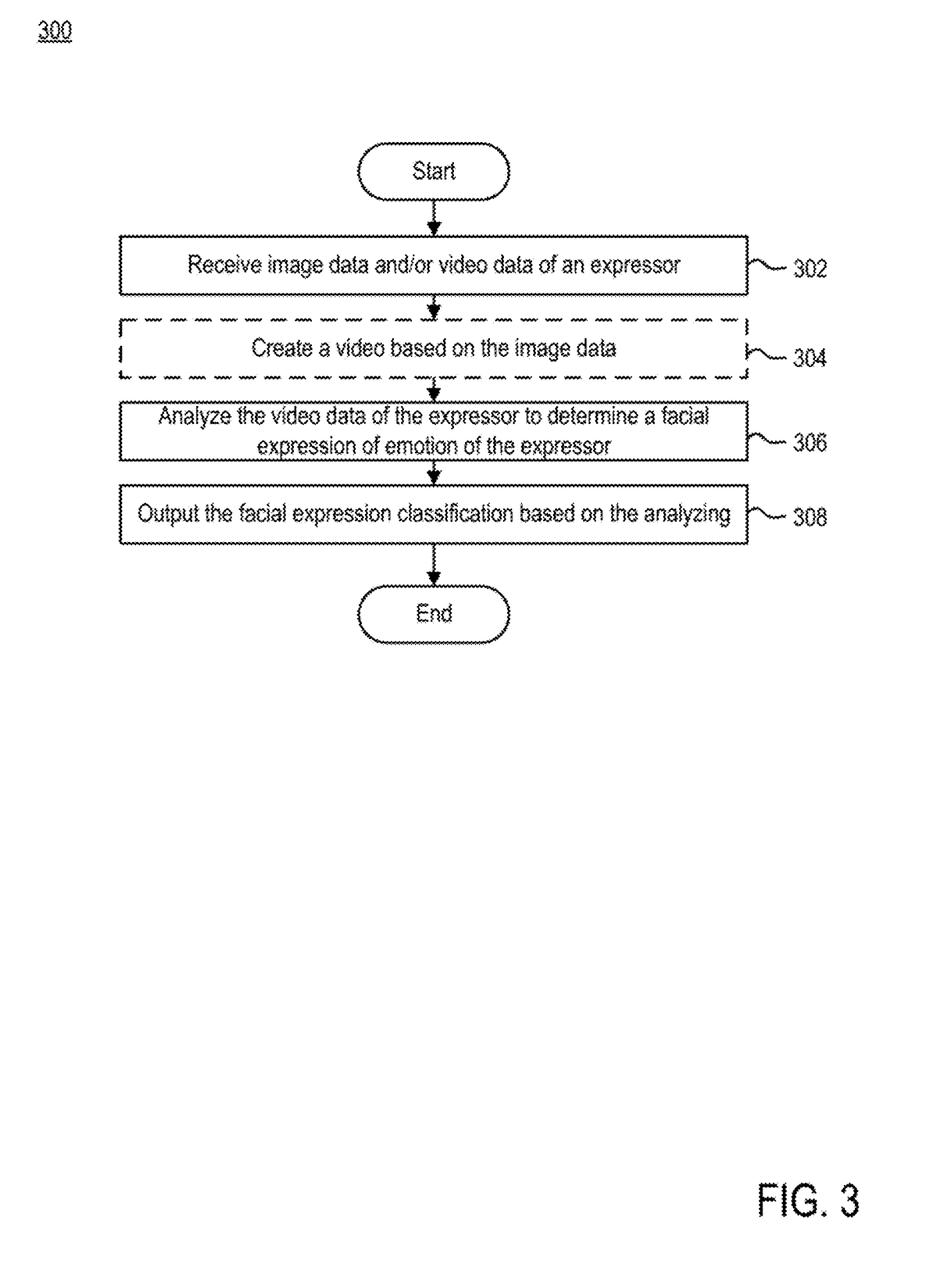
FIG. 3 is a flow diagram illustrating a method of classifying an expressor's facial configuration, according to example embodiments.

FIG. 3 is a flow diagram illustrating a method 300 of classifying an expressor's facial configuration, according to example embodiments. Method 300 may begin at step 302.

At step 302, facial analysis system 120 may receive image data and/or video data of an expressor. In some embodiments, the image data and/or video data may be uploaded by a user from client device 102. In some embodiments, the image data and/or video data may be uploaded by camera 108.

In some embodiments, method 300 may include step 304. At step 304, facial analysis system 120 may create a video based on still images of the expressor. For example, facial analysis system 120 may receive neutral images of the same expressor and then render the neutral images with the expressing images to create a moving face in a video.

At step 306, facial analysis system 120 may analyze the video data of the expressor to determine a facial expression of emotion exhibited by the expressor. For example, trained model 216 may receive, as input, the video data.

In some embodiments, determining the facial expression of emotion of the expressor may include trained model 216 identifying and tracking excursions of any facial muscle in the video data.

Facial analysis system 120 may identify and/or classify facial configurations based on the one or more parameters. For example, facial analysis system 120 may identify all action units that simultaneously occur during the apex period and may classify these action units as a configuration.

facial analysis system 120 may identify and/or classify possible facial expressions of emotion based on the facial configurations. For example, facial analysis system 120 may divide the action units in a configuration into "critical" and "non-critical" action units. Facial analysis system 120 may compare the "critical" action units in the facial configurations to a list of critical action units that are associated with facial expressions of emotion to identify matches with known facial expressions of emotion. Facial analysis system 120 may compare non-critical action units in the facial configurations to the "allowed" and "not allowed" lists of non-critical action units to further refine the possible facial expressions of emotion classification. In some embodiments, non-critical action units that are in the "allowed" list may not interfere with the classification of the configurations as possible facial expressions of emotion. In some embodiments, non-critical action units that are in the "not allowed" list may qualify the classification of possible facial expressions of emotions. In some embodiments, such classifications may be noted with a question mark.

In some embodiments, when identifying and/or classifying possible facial expressions of emotion based on the facial configurations, facial analysis system 120 may ignore some action units if they occur simultaneously (or temporally) with speech. If, however, timing or intensity of these action units differ clearly from the movements that occur during speech, then these action units may be counted in the configurations.

Facial analysis system 120 may classify those critical action units in the facial configurations that match the known critical action units that match facial expressions of emotion, and that involve "allowed" non-critical action units as "possible facial expressions of emotion." Critical action units in the facial configurations that match the known critical action units that match facial expressions of emotion, but that involve "non-allowed" non-critical action units may be classified as possible facial expressions of emotion but noted with a question mark. In some embodiments, facial analysis system 120 may generate an initial classification of facial expressions of emotion based on the possible facial expressions of emotion.

Facial analysis system 120 may further analyze the possible facial expressions of emotion according to whether or not they meet the criteria for behavioral dynamics. For example, facial analysis system 120 may determine simultaneous onset based on the generated onset time. Facial analysis system 120 may compare the onset times for all critical units in the configuration. Based on the comparison, facial analysis system 120 may make a determination about the simultaneous onset. For example, if the start (e.g., onset) of the critical action units in the configuration are within a threshold tolerance of each other (e.g., 15-30 ms), facial analysis system 120 may classify such movement as simultaneous.

To determine a facial expression of emotion exhibited by the expressor, facial analysis system 120 may use trained model 216 to identify timing characteristics of the excursions. For example, trained model 216 may identify onset time (e.g., time when muscle first begins to move), apex start time (e.g., start time of maximum muscle contraction), apex end time (end time of maximum muscle contraction), and offset time (e.g., time when muscle returns to baseline or resting state).

Facial analysis system 120 may fit a function through the data during onset and offset periods to derive the rate or acceleration of muscle movement and smoothness of the muscle movement. In some embodiments, the function may be a Gauss-Newton algorithm. Facial analysis system 120 may perform such processes for each facial muscle that may be moving simultaneously or during excursion of a muscle. If, for example, the muscle movements are asymmetrical, facial analysis system 120 may perform such processes for the right and left sides of the muscles.

Facial analysis system 120 may further determine the smooth onset.

In some embodiments, to determine the smooth onset, facial analysis system 120 may utilize a function (e.g., Gauss-Newton algorithm) to describe the onset period and the associated statistics (e.g., derivatives) to calculate the goodness of fit between the smoothed curve and the actual data points. Facial analysis system 120 may use the first and/or second derivatives of the function that reflect rate of change and smoothness of the function to determine the smooth onset. Facial analysis system 120 may perform such analysis for each action unit. In some embodiments, the function may be an acceleration function in which the acceleration rates for different muscles are analyzed.

In some embodiments, to determine smooth onset, facial analysis system 120 may identify or determine the onset time and apex start time for all action units, as well as the acceleration rates. In some embodiments, if the onset time and apex start time for all art units are the same (and for both right and left sides of the same action unit), then facial analysis system 120 may determine that the muscle had the same trajectory from onset to apex. In some embodiments, if the acceleration rates for all art units are the same (and for both right and left sides of the same action unit), then facial analysis system 120 may determine that the muscle had the same trajectory from onset to apex.

Facial analysis system 120 may further determine shared apex duration. For example, facial analysis system 120 may identify a start time and an end time of an apex for each critical action unit. Facial analysis system 120 may make a determination of shared apex duration. For example, if the start time and end time of the apex for each critical action unit is within a threshold tolerance of each other (e.g., 15-30 ms), then facial analysis system 120 may consider the action units having shared apex duration.

Facial analysis system 120 may further determine a symmetry. In some embodiments, facial analysis system 120 may determine an intensity symmetry and/or a timing symmetry. To determine an intensity symmetry, facial analysis system 120 may identify the intensity level of the critical action units in the configuration at apex, separately for both the left and right sides of the face. If the intensity levels of both right and left sides of the same action unit are the same, facial analysis system 120 may classify them as symmetrical; otherwise, facial analysis system 120 may classify them as non-symmetrical.

In some embodiments, to determine a timing symmetry, if the difference in apex start time between the right and left sides of any muscle is less than a threshold (e.g., 15-30 ms), then facial analysis system 120 may classify it is symmetrical; otherwise, facial analysis system 120 may classify it as asymmetrical. In some embodiments, to determine a timing symmetry, if the difference in acceleration rates between the right and left sides of any muscle is less than a threshold, then facial analysis system 120 may classify it is symmetrical; otherwise, facial analysis system 120 may classify it as asymmetrical.

Facial analysis system 120 may further determine a smooth offset. In some embodiments, to determine a smooth offset, facial analysis module may use the function generated to describe the offset period and the associated statistics (derivatives) to calculate the goodness of fit between the smoothed curve and actual data points. For example, facial analysis system 120 may use the first and second derivatives of the function that reflect rate of change and smoothness of the function to determine the smooth offset. In some embodiments, the function may be an acceleration function in which the acceleration rates for different muscles are analyzed. Facial analysis system 120 may perform such process for all action units.

In some embodiments, to determine a smooth offset, facial analysis system 120 may determine that apex end times and offset times are the same for all action units, as well as for both right and left sides of the same action units. If facial analysis system 120 determines that the apex end and offset times are the same, facial analysis system 120 may conclude that the muscle had the same trajectory from apex to offset.

facial analysis system 120 may generate a final classification of facial expressions of emotion based on the initial classification. For example, facial analysis system 120 may classify possible facial expressions of emotions that have simultaneous onsets, smooth onsets, shared apexes, symmetrical, and smooth offsets as facial expressions of emotion. Facial analysis system 120 may retain the possible facial expressions of emotion classification for those possible facial expressions of emotions that have simultaneous onsets, smooth onsets, shared apexes, symmetrical, or smooth offsets. In some embodiments, facial analysis system 120 may determine the facial expressions of emotion was spontaneous based on the determined duration of the facial expression of emotion.

At step 308, facial analysis system 120 may output the facial expression classification.

Figure 4:
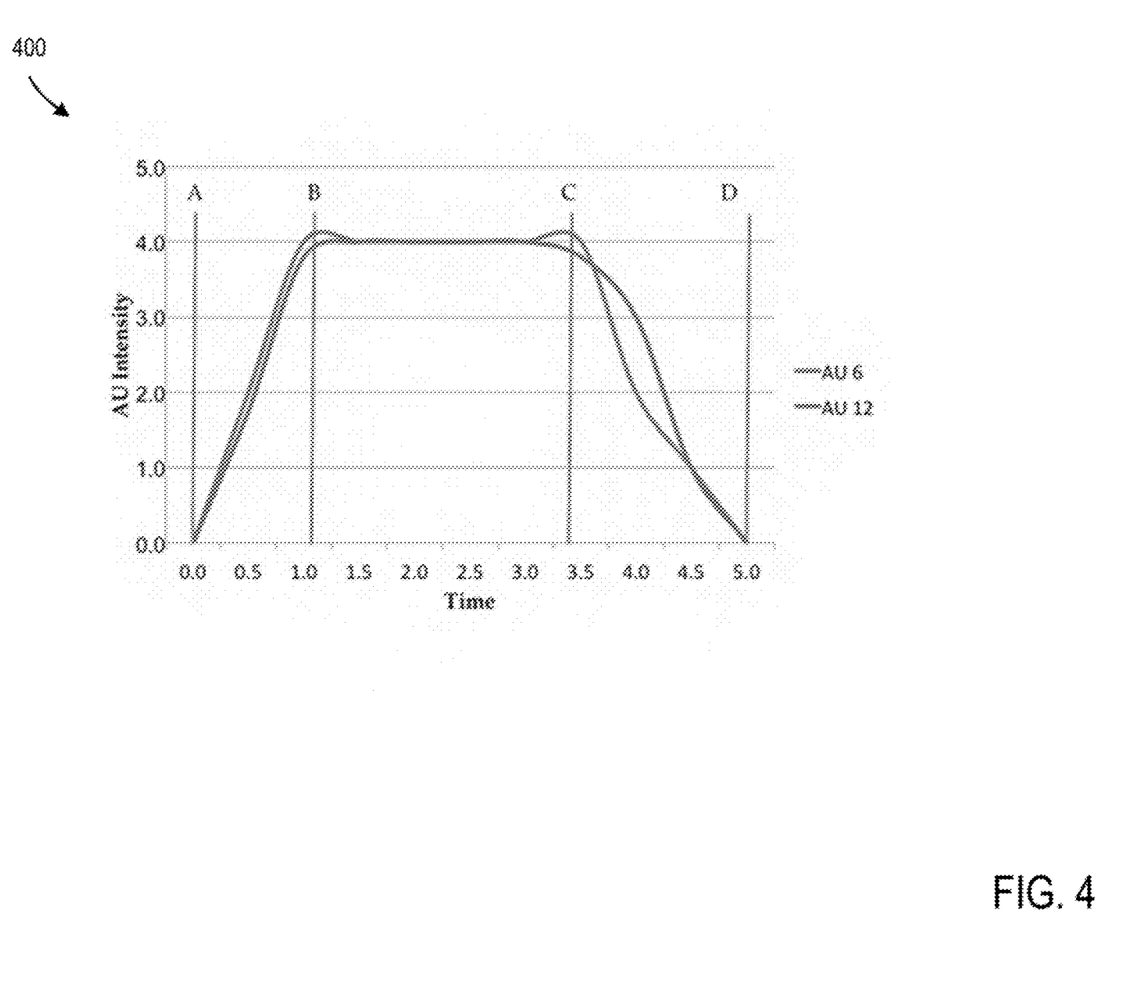
FIG. 4 is a chart illustrating exemplary intensity levels of action units, according to example embodiments.

FIG. 4 is a chart 400 illustrating exemplary intensity levels and timing characteristics of action units, according to example embodiments. As shown, chart 400 may illustrate sample smile dynamics of action unit 6 (AU 6) and action unit 12 (AU 12) across a five second time period.

According to chart 400, AU 6 and AU 12 are identified as apexing simultaneously (BC) and are thus classified by facial analysis system 120 as a "configuration." Facial analysis module may divide the action units into "critical" and "non-critical" action units. As illustrated in this example, both AU 6 and AU 12 are critical action units. Facial analysis system 120 may compare "critical" action units in the facial configurations to known critical action units that are associated with facial expressions of emotion to identify matches with known facial expressions of emotion. In the current example, facial analysis system 120 may determine that the critical action units match the critical action units for the classification of "enjoyment smile."

If, facial analysis system 120 determines that there are non-critical action units (which there are none in this example), facial analysis system 120 would compare non-critical action units in the facial configurations to the "allowed" and "not allowed" lists of non-critical action units to further refine the possible facial expressions of emotion classification.

Facial analysis system 120 may classify the critical action units in the facial configurations that match the known critical action units that match facial expressions of emotion, and that involve "allowed" non-critical AUs as "possible facial expressions of emotion."

Facial analysis system 120 may further analyze the possible facial expressions of emotion according to whether or not they meet criteria for behavioral dynamics. In doing so, facial analysis system 120 may perform one or more of the following operations. For example, facial analysis system 120 may determine simultaneous onset, smooth onset (e.g., do both action units have the same smooth onset accelerations), shared apex duration (e.g., do both action units have the same apex time), intensity symmetry (e.g., do the right and left sides of both action units have the same intensity), timing symmetry (e.g., do the right and left sides of both action units have the same timing characteristics), smooth offset (e.g., do both action units have the same smooth offset decelerations.

Based on the one or more operations, facial analysis system 120 may determine a final classification of the facial expressions of emotion. For example, the configuration identified in FIG. 4 may has simultaneous onsets, smooth onsets, shared apexes, symmetry, and smooth offsets. Accordingly, facial analysis system 120 has classified this configuration as "enjoyment smile."

Figure 5A:
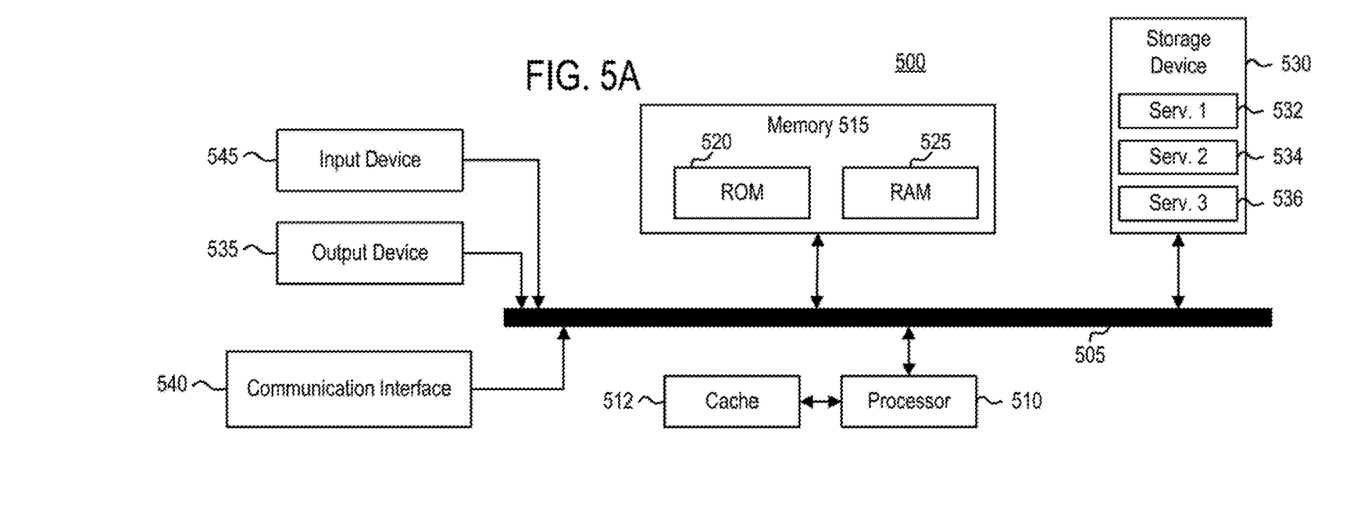
FIG. 5A illustrates a system bus computing system architecture, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 5 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

Figure 5B:
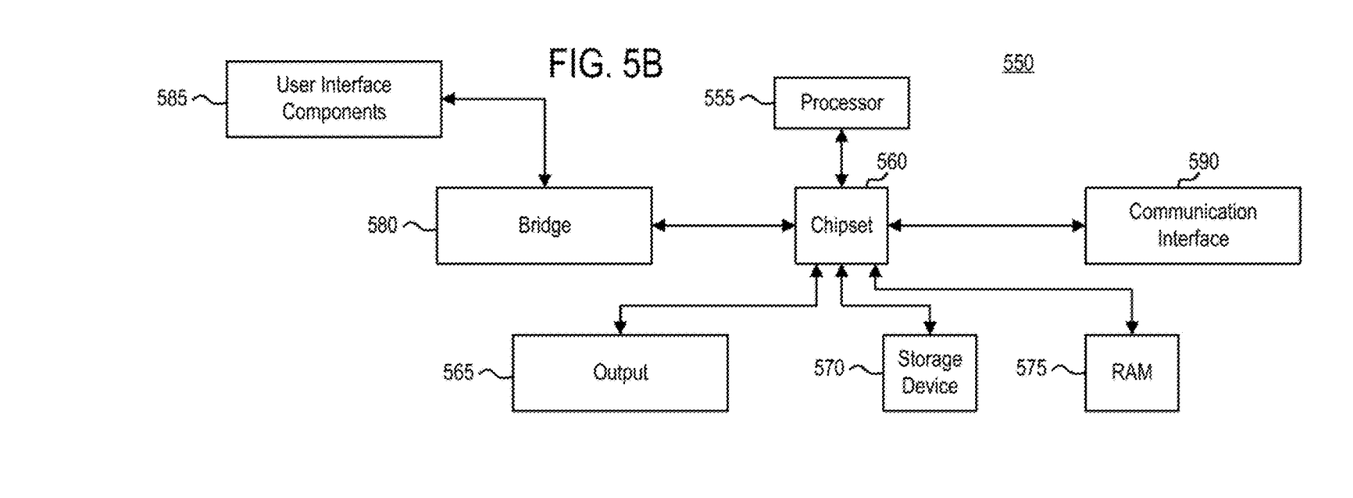
FIG. 5B illustrates a computer system having a chipset architecture, according to example embodiments.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
identifying, by a computing system, video data capturing an expressor depicting facial behavior of a face of the expressor;
analyzing, by the computing system, the video data to determine a type of emotion exhibited by the expressor in the video data by:
identifying appearance changes produced by movements of facial muscles in the video data; and
determining timing characteristics of the movements of the facial muscles in the video data, the timing characteristics indicating whether the facial behavior depicted by the expressor is an authentic expression or fake expression, the determining comprising:
determining whether the movements of specific facial muscles comprise simultaneous and smooth onset,
determining whether the movements of the specific facial muscles peak at approximately the same time,
determining whether the movements of the specific facial muscles relax at the same time, and
determining whether the movements of the specific facial muscles are symmetrical;
generating, by the computing system, a classification of the type of emotions exhibited by the expressor by evaluating whether the movements of the facial muscles comprise simultaneous and smooth movements from onset to apex, whether the movements of the facial muscles peak at approximately the same time, whether the movements of the facial muscles relax at the same time, and whether the movements of the facial muscles are symmetrical on both sides of the face; and
outputting, by the computing system, the classification.

2. The method of claim 1, wherein identifying, by the computing system, the video data capturing the expressor depicting the facial behavior comprises:
receiving a plurality of still images of the expressor, the plurality of still images comprising a first set of images comprising images capturing activation of the specific facial muscles and a second set of images comprising neutral images showing the facial muscles with no activation.

3. The method of claim 2, wherein generating, by the computing system, a classification of the type of emotions exhibited by the expressor comprises:
comparing timings of the specific facial muscles in the second set of images comprising the neutral images to determine simultaneous offsets;
comparing changes from the neutral images to the apex across the second set of images to determine smooth onset;
comparing a time from apex back to neutral for each of the specific facial muscles; and
determining symmetry by assessing the amplitude of muscle activation on a left side and a right side of the face.

4. A non-transitory computer readable medium comprising one or more sequences of instructions, which, when executed by a processor, causes a computing system to perform operations comprising:
identifying, by the computing system, video data capturing an expressor depicting facial behavior of a face of the expressor;
analyzing, by the computing system, the video data to determine a type of emotion exhibited by the expressor in the video data by:
identifying appearance changes produced by movements of facial muscles in the video data; and
determining timing characteristics of the movements of the facial muscles in the video data, the timing characteristics indicating whether the facial behavior depicted by the expressor is an authentic expression or fake expression, the determining comprising:
determining whether the movements of specific facial muscles comprise simultaneous and smooth onset,
determining whether the movements of the specific facial muscles peak at approximately the same time,
determining whether the movements of the specific facial muscles relax at the same time, and
determining whether the movements of the specific facial muscles are symmetrical;
generating, by the computing system, a classification of the type of emotions exhibited by the expressor by evaluating whether the movements of the facial muscles comprise simultaneous and smooth movements from onset to apex, whether the movements of the facial muscles peak at approximately the same time, whether the movements of the facial muscles relax at the same time, and whether the movements of the facial muscles are symmetrical on both sides of the face; and
outputting, by the computing system, the classification.

5. The non-transitory computer readable medium of claim 4, wherein identifying, by the computing system, the video data capturing the expressor depicting the facial behavior comprises:
receiving a plurality of still images of the expressor, the plurality of still images comprising a first set of images comprising images capturing activation of the specific facial muscles and a second set of images comprising neutral images showing the facial muscles with no activation.

6. The non-transitory computer readable medium of claim 5, wherein generating, by the computing system, a classification of the type of emotions exhibited by the expressor comprises:
comparing timings of the specific facial muscles in the second set of images comprising the neutral images to determine simultaneous offsets;
comparing changes from the neutral images to the apex across the second set of images to determine smooth onset;
comparing a time from apex back to neutral for each of the specific facial muscles; and
determining symmetry by assessing the amplitude of muscle activation on a left side and a right side of the face.

7. A system, comprising:
a processor; and
a memory having programming instructions stored thereon, which, when executed by the processor, causes the system to perform operations comprising:
identifying video data capturing an expressor depicting facial behavior of a face of the expressor;
analyzing the video data to determine a type of emotion exhibited by the expressor in the video data by:

identifying appearance changes produced by movements of facial muscles in the video data; and determining timing characteristics of the movements of the facial muscles in the video data, the timing characteristics indicating whether the facial behavior depicted by the expressor is an authentic expression or fake expression, the determining comprising:
- determining whether the movements of specific facial muscles comprise simultaneous and smooth onset,
- determining whether the movements of the specific facial muscles peak at approximately the same time,
- determining whether the movements of the specific facial muscles relax at the same time, and
- determining whether the movements of the specific facial muscles are symmetrical;

generating a classification of the type of emotions exhibited by the expressor by evaluating whether the movements of the facial muscles comprise simultaneous and smooth movements from onset to apex, whether the movements of the facial muscles peak at approximately the same time, whether the movements of the facial muscles relax at the same time, and whether the movements of the facial muscles are symmetrical on both sides of the face; and outputting the classification.

8. The system of claim 7, wherein identifying the video data capturing the expressor depicting the facial behavior comprises:
receiving a plurality of still images of the expressor, the plurality of still images comprising a first set of images comprising images capturing activation of the specific facial muscles and a second set of images comprising neutral images showing the facial muscles with no activation.

9. The system of claim 8, wherein generating a classification of the type of emotions exhibited by the expressor comprises:
- comparing timings of the specific facial muscles in the second set of images comprising the neutral images to determine simultaneous offsets;
- comparing changes from the neutral images to the apex across the second set of images to determine smooth onset;
- comparing a time from apex back to neutral for each of the specific facial muscles; and
- determining symmetry by assessing the amplitude of muscle activation on a left side and a right side of the face.

* * * * *